(12) United States Patent
Otten

(10) Patent No.: US 11,361,358 B2
(45) Date of Patent: Jun. 14, 2022

(54) SYSTEM AND METHOD FOR AUTOMATED GENERATION OF TEXTUAL DESCRIPTION OF A VEHICLE

(71) Applicant: Autodata Solutions, Inc., El Segundo, CA (US)

(72) Inventor: Hans Otten, London (CA)

(73) Assignee: Autodata Solutions, Inc., Troy, MI (US)

( * ) Notice: Subject to any disclaimer, the term of this patent is extended or adjusted under 35 U.S.C. 154(b) by 62 days.

(21) Appl. No.: 16/435,405

(22) Filed: Jun. 7, 2019

(65) Prior Publication Data

US 2020/0387946 A1    Dec. 10, 2020

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0627* (2013.01); *G06Q 30/0277* (2013.01); *G06Q 30/0621* (2013.01); *G06Q 30/0643* (2013.01)

(58) Field of Classification Search
CPC .......... G06Q 30/0627; G06Q 30/0277; G06Q 30/0621; G06Q 30/0643
See application file for complete search history.

(56) References Cited

U.S. PATENT DOCUMENTS 8,548,968 B2   10/2013  Zak, Jr. et al.

| 10,235,602 B1 * | 3/2019 | Vasisht | G06K 9/6267 |
| 2013/0198167 A1 * | 8/2013 | Sullivan | G06K 9/6878 707/722 |
| 2014/0279263 A1 | 9/2014 | Liu et al. | |

(Continued)

FOREIGN PATENT DOCUMENTS

WO   WO-2006047829 A1 *   5/2006   ............. G06Q 30/00

OTHER PUBLICATIONS

Bansal, Shivani, Meenu Gupta, and Amit Kumar Tyagi. "Building a Character Recognition System for Vehicle Applications." Advances in Decision Sciences, Image Processing, Security and Computer Vision. Springer, Cham, 2020. 161-168.*

(Continued)

*Primary Examiner* — Kathleen Palavecino
(74) *Attorney, Agent, or Firm* — Rutan & Tucker, LLP

(57) ABSTRACT

A system for automatically generating textual information describing a vehicle being advertised for purchase is disclosed. The system comprises a processor and a memory communicatively coupled to the processor, the memory including: a vehicle identification number (VIN) decoder logic to decode a VIN to determine a vehicle represented by the VIN, a feature determination logic configured to determine a normalized list of features associated with the vehicle, and a vehicle text generation logic configured to generate textual information describing the vehicle. The memory further includes a feature prioritization logic configured to perform prioritization operations to determine priority values associated with one or more features of the normalized list of features. In some instances, decoding the VIN includes (i) determining attributes of the vehicle including make, model and year, and (ii) retrieving vehicle option codes from a first data store, wherein the vehicle option codes are associated with the VIN.

19 Claims, 3 Drawing Sheets

(56) References Cited

U.S. PATENT DOCUMENTS

| | | | |
|---|---|---|---|
| 2014/0303839 A1 | 10/2014 | Filev et al. | |
| 2016/0057154 A1* | 2/2016 | Ferguson | H04L 63/08 |
| | | | 726/7 |
| 2016/0364783 A1 | 12/2016 | Ramanuja et al. | |
| 2017/0069016 A1* | 3/2017 | Rackley | G06F 7/026 |
| 2018/0174221 A1* | 6/2018 | Merg | G06Q 30/0633 |
| 2019/0012603 A1 | 1/2019 | Miller et al. | |
| 2019/0073560 A1 | 3/2019 | Matei et al. | |
| 2020/0410465 A1* | 12/2020 | Dalinina | G06Q 30/0627 |

OTHER PUBLICATIONS

U.S. Appl. No. 16/290,691, filed Mar. 1, 2019 Final Office Action dated Dec. 30, 2020.
U.S. Appl. No. 16/290,691, filed Mar. 1, 2019 Non-Final Office Action dated Aug. 4, 2020.
U.S. Appl. No. 16/290,691, filed Mar. 1, 2019 Non-Final Office Action dated Jun. 23, 2021.
U.S. Appl. No. 16/290,691, filed Mar. 1, 2019 Final Office Action dated Feb. 9, 2022.

\* cited by examiner

SYSTEM AND METHOD FOR AUTOMATED GENERATION OF TEXTUAL DESCRIPTION OF A VEHICLE

FIELD

Embodiments of the disclosure relate to the field of automated text generation and display. More specifically, one embodiment of the disclosure relates to a system and method for automatically generating a textual description of a vehicle according to a plurality of inputs and correlating those inputs with stored data to generate a textual description for display.

GENERAL BACKGROUND

Car dealerships often have several cars located on their lots, sometimes hundreds or even thousands spread among a plurality of lots. Consumers may physically visit a dealership and their associated lots to view specific cars in person. By doing so, a consumer has the opportunity to assess the condition of a specific car and review the specific car's exact features. In such situations, a consumer is able to obtain a complete understanding of a specific car the consumer may desire to purchase.

However, physically visiting a dealership is often inconvenient for consumers. For example, consumers may have busy schedules and be unable to visit the dealership during the hours that the dealership is open. Additionally, the internet has provided a medium for presenting consumers with information that allows the consumer to review the information at any time and at any place, assuming an internet connection is available.

As a result, dealerships have begun to utilize the internet and utilize websites that provide consumers with information directed to vehicles (e.g., cars) on their lots. These dealership websites have several flaws and, as a result, do not provide consumers the same opportunity to obtain a complete understanding of a specific vehicle as provided when physically visiting a dealership's lot and inspecting a specific vehicle in person. For example, dealership web sites often provide digital images of vehicles that may be referred to as "stock images." Stock images are generic images of a certain make and model of a vehicle provided by the manufacturer, not images of a specific vehicle located at a particular dealership having a unique Vehicle Identification Number (VIN). When a dealership website utilizes stock images, upon visiting the dealership website, a consumer may obtain a general understanding of a particular vehicle type; however, the consumer is unable to see the specific vehicles residing at the dealership. Additionally, the stock images may not provide enough angles or views of the vehicle to assist the consumer in deciding whether to purchase the vehicle or visit the dealership.

In certain instances, in lieu of stock images, dealership web sites may utilize images of specific vehicles at their dealerships (referred to as "lot images"). Dealerships may obtain digital images of the specific vehicles on their lots from a third-party photographer hired to take a set of photographs of certain vehicles and transmit the digital images (i.e., lot images) to the dealership for placement on its website along with textual information directed to the vehicle features captured by each digital image. However, the images received by a dealership do not include any information identifying the features shown in each image. Therefore, although the dealership may provide textual information describing the features of the specific vehicle on their website, there is no coordination between the textual information and the vehicle image displayed. As a result, when a dealership includes the images of a specific vehicle on their website, in some cases, the textual information displayed does not effectively correspond to the features of the vehicle captured by the displayed image. For instance, the textual information not include certain features, which may be a selling-point, or may even include incorrect information. This inconsistency, or even inaccuracy, could adversely affect a dealership as accurate delivery of the vehicle image(s) and selected textual information may greatly influence whether a potential customer actually purchases the vehicle.

Furthermore, as many consumers rely on search engines when initially searching for vehicles on the internet, it is imperative that dealerships' websites include accurate text that is searchable and indexable by search engines (e.g., "SEO friendly" with SEO referring to search engine optimization).

In order to provide a consumer with a complete understanding of the specific vehicle on a dealership's lot, it would be advantageous for the dealership's website to not only include accurate and comprehensive textual information of each vehicle, that textual information should be SEO friendly. However, currently, a dealership is often unable to determine the features for every vehicle on their lots. For instance, as mentioned above, a dealership may have hundreds or thousands of vehicles on their lots and, as there is high turnover on dealership's lot, attempting to manually determine the features of each vehicle and translate those features into SEO friendly text would be a very inefficient use of the dealership's time and resources.

BRIEF DESCRIPTION OF THE DRAWINGS

Embodiments of the disclosure are illustrated by way of example and not by way of limitation in the figures of the accompanying drawings, in which like references indicate similar elements and in which.

DETAILED DESCRIPTION

Figure 1:
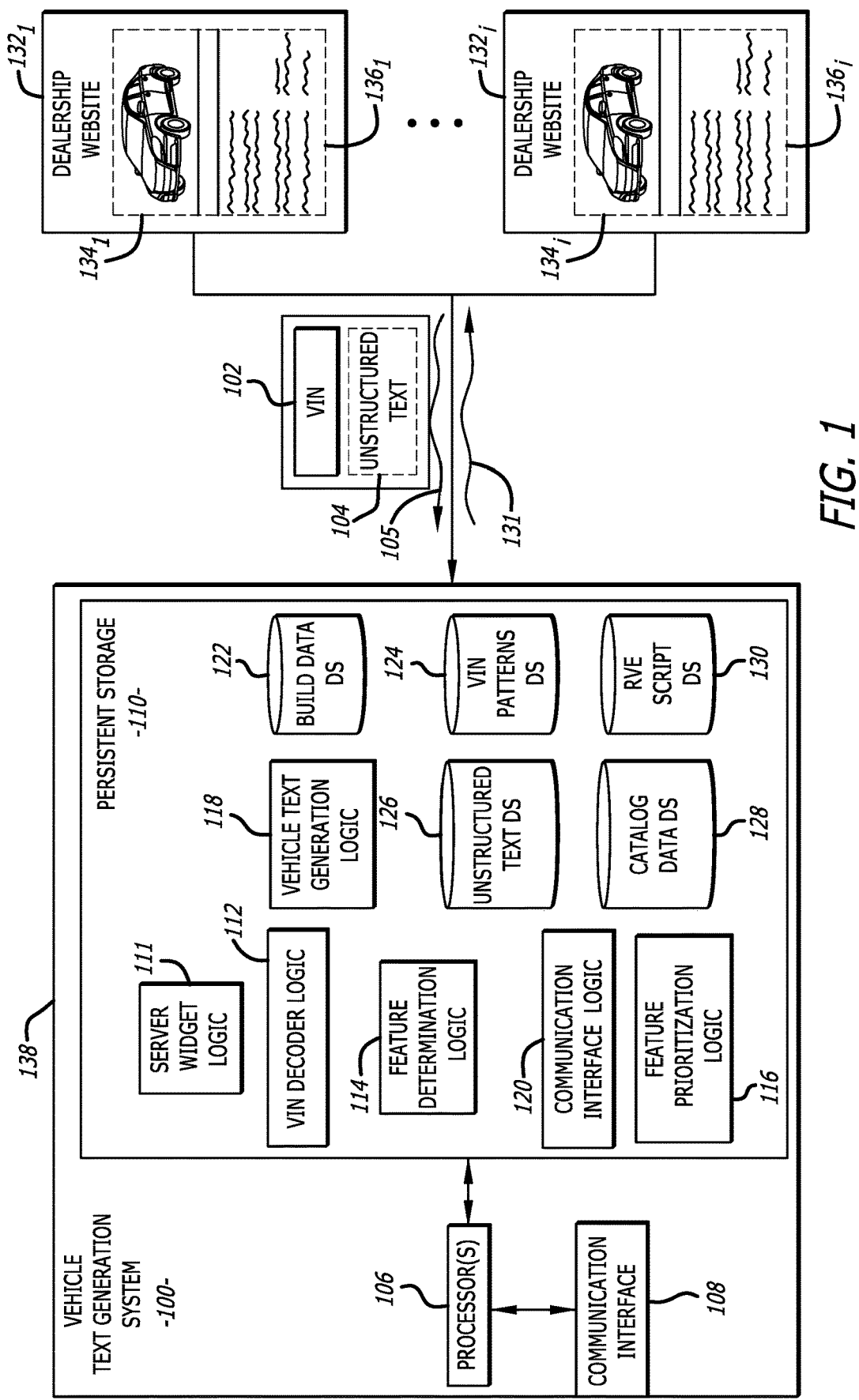
FIG. 1 is an exemplary embodiment of a logical representation of an automated vehicle text generation system.

Various embodiments of the disclosure are directed to an automated system and a method for performing a process that includes (1) decoding a Vehicle Identification Number (VIN) to determine at least a make, model, year, and, a specific trim of the vehicle represented by the VIN (collectively, "vehicle catalog data"), (2) using build data to determine manufacturer's options included in the vehicle, e.g., selected manufacturer's options, (e.g., represented as option codes), (3) based on a mapping of the option codes to industry-standard IC codes ("industry comparison" codes or proprietary "standardized codes"), determining vehicle features, (4) determining the "notable" features via a prioritization process, (5) generating textual information describing the specific vehicle represented by the VIN including the vehicle's notable features, and (6) displaying the textual information. In some embodiments, one or more predetermined rule sets are deployed in generating textual information that provides a comprehensive description of a particular vehicle. The deployment of the one or more predetermined rule sets take into account several factors during the textual information generation process including data associated with the vehicle determined as a result of decoding of the VIN. Additional factors used in the generation process may be learned from meta-information included as part of a request message.

As the automated system accurately generates comprehensive descriptions of a particular vehicle based on a received VIN, the system provides benefits to both a dealership and consumers in the process of buying and selling a vehicle.

I. Overview

As described below, an automated system (referred to as a "vehicle text generation (VTG) system") is configured to store or have access to information describing particular features available for many types of manufactured vehicles. The VTG system may include various logic modules, each configured to perform specific operations for decoding a vehicle identification number (VIN) of a particular vehicle in order to determine (and prioritize) the specific features associated with the vehicle represented by the VIN. Additional logic modules of the VTG system are configured to perform specific operations for automatically generating textual information based on the information gleaned from decoding the VIN, including any information accessed or retrieved from one or more data stores during the decoding process. The generated textual information may then be provided or displayed to a consumer in one of many methods, including rendering for display on a webpage, transmission via an email or other electronic communication, and/or display at a dealership (e.g., in the form of a sticker placed on the vehicle represented by the VIN).

In addition to automatically generating textual information that describes a particular vehicle through decoding of vehicle's VIN, the VTG system may be configured to store or have access to vehicle images in order to render one or more images of the vehicle represented by the VIN alongside the rendering of the generated textual information. For example, the VTG system may be coupled to, or combined with a vehicle image display (VID) system, as described in U.S. application Ser. No. 16/290,691 entitled "System and Method for Identifying and Prioritizing Notable Features," filed Mar. 1, 2019, the entire contents of which are incorporated by reference herein.

Responsive to a request message for textual information pertaining to a vehicle, where the request message is provided from a widget on a dealership website (e.g., provided automatically upon activation of the widget when a consumer accesses a dealership website or upon consumer selection), server widget logic deployed within the VTG system provides the VIN, and any unstructured text, if included, to the VIN decoder logic, which decodes the VIN to determine at least a vehicle type. As is known, each VIN may be represented as a seventeen alphanumeric character string including one or more alphanumeric characters (e.g. first three most significant letters or numbers, third most significant letter or number, etc.) that identifies the vehicle type. For instance, according to one embodiment of the disclosure, the vehicle type may include any one of the following: (i) sedan, (ii) truck, (iii) sport utility vehicle "SUV," (iv) van, or (v) commercial.

Based on the VIN and the vehicle catalog data, the VIN decoder logic accesses "build data" to determine vehicle option codes associated with the VIN by mapping vehicle option codes to the VIN. According to one embodiment, the "build data" may include vehicle option codes for millions of vehicles that are classified by their VINs. Each "vehicle option code" (or "option code") is a prescribed value that is used by a particular original equipment manufacturer (OEM) to identify what standard equipment is installed on the vehicle identified by the VIN. The data retrieved when accessing the build data DS is referred to as the "selected manufacturer's options."

Following retrieval of the selected manufacturer's options corresponding to the vehicle represented by the VIN, feature determination logic operating within the VTG system facilitates the mapping of the selected manufacturer's options to IC codes. As discussed below, the selected manufacturer's options may be retrieved from the build data DS in the form of option codes. The option codes may be provided to a RVE script within the RVE script DS, which queries the catalog data DS in order to determine the mapping of the option codes to IC codes. The RVE script may then translate the IC codes into text such that the data returned to the feature determination logic is a normalized list of features of the vehicle represented by the VIN. Additionally, the feature determination logic may also provide the RVE script with the catalog vehicle data, which may also be included in the normalized list of features. In particular, the catalog data DS may be propriety information, and in some embodiments, may be maintained for all vehicles built in North America over several decades (e.g., since 1992); however, the catalog data DS may include additional data, i.e., on vehicles built in other geographic regions and during additional time periods. Accessing the normalized IC codes enables the VTG system 100 to determine the features of the vehicle represented by the VIN 102 regardless of the methodology of packaging and marketing of options by each OEM.

Subsequent to the determination of the normalized list of features, feature prioritization logic is deployed within the VTG system to perform one or more prioritization schemes, including the grouping and/or sorting features associated with a vehicle identified by the VIN included in the request message from the widget. According to one embodiment of the disclosure, features associated with the vehicle are grouped and/or sorted according to priority values assigned to both the features individually as well as grouping (e.g., subsections) inclusive of the features. More specifically, the feature prioritization logic prioritizes the features organized within a plurality of sections and subsections. "Sections" are groupings organized by general vehicle-specific classes, such as fuel economy and emissions, in-car entertainment, and/or safety and security for example. "Subsections" are subgrouping conducted within each section, which represent particular components that are further defined by the individual features. For instance, as an illustrative example, a "safety and security" section may include at least the following subsections: active driving assistance; airbags; brakes; and/or cameras. The individual features of the vehicle are assigned to the particular subsections.

Accompanying each of the subsections and/or features is metadata that identifies a priority value (ranking) assigned to that subsection and/or feature. The priority values represent what subsection(s) and/or feature(s) are "notable" for a particular vehicle to which the features pertain, namely a ranking of what features or grouping of features are the more important in a vehicle purchasing decision. Whether a feature is considered to be a "notable" feature or not may depend, at least in part, on (i) the vehicle type (e.g., car, truck, sport utility vehicle "SUV", van, commercial) associated with the VIN provided from the widget, (ii) the priority value assigned to the subsection associated with the feature, and/or (iii) external factors (e.g., consumer profile, geography, etc.) learned from meta-information included as part of the request message. Further, each section may be ordered depending on the vehicle type. For instance, within a "truck" vehicle class, the feature prioritization logic may assign different ordering to the sections defining aspects of the vehicle than similar sections within a "van" vehicle class.

Following the prioritization of the features, vehicle text generation logic analyzes the vehicle catalog data and the presence (or lack thereof) of build data corresponding to the received VIN to determine an applicable "use case." Based on the use case, the vehicle text generation logic retrieves and executes one or more applicable rule sets to construct a plurality of sentences utilizing text characterizing one or more features. The plurality of sentences are assembled to form a paragraph that describes the vehicle identified by the received VIN. The server widget logic may then transmit the textual information to an electronic device from which the request message was received for rendering of the textual information.

In summary, after receipt of a request message from a widget at a website and decoding the VIN provided within the request message to determine the features available on a vehicle identified by the VIN, the feature prioritization logic performs one or more prioritization schemes. The vehicle text generation (VTG) logic generates textual information that comprehensively describes the vehicle represented by the VIN based at least in part on, the VIN, the vehicle catalog data, the catalog data, and the determined and prioritized features. The automatic generation process may utilize a set of predetermined rules stored in a rules data stores accessible to the VTG system. In other embodiments, the VTG system may apply a machine learning model to detect specific aspects of the vehicle catalog data, the catalog data, and the features in order to generate textual information. The textual information may include full, grammatically correct sentences including proper punctuation, appropriate use of plural or singular nouns, appropriate use of verbs, and the like. As is well understood, performing operations to correctly generate full sentences is not an easy task as there are hundreds, if not thousands, of nuances to each language. Thus, the VTG logic performs complex and intricate operations in order to accurately generate a grammatically proper description of the vehicle represented by the VIN.

In some embodiments, the consumer may be provided one or more vehicle images of the vehicle represented by the VIN. The disclosure provides some details as to selection and retrieval of vehicle images by the VTG system; however, the VTG system may be coupled with the VID system of U.S. patent application Ser. No. 16/290,691, the disclosure of which provides additional details.

In such embodiments in which one or more vehicle images are to be provided, the VTG system 100 may provide the textual information in portions, with a first portion associated with a first vehicle image. For example, a first portion of textual information may be provided that is associated with a first vehicle image being a perspective view of the exterior of the vehicle while the first portion of textual information describes standard components of the vehicle. Additionally, a second portion of textual information may be provided that is associated with a second vehicle image depicting the center console of the vehicle while the second portion of textual information describes electronic features of the vehicle (e.g., encapsulated in the center console). Subsequently, when providing the generated textual information in multiple portions, the VTG logic and/or the server widget logic may add metadata to each portion such that the rendering of the dealership website accurately pairs a portion of textual information with the corresponding vehicle image. Alternatively, or in addition, the server widget logic may provide instructions to the widget of the dealership website that facilitate accurate rendering of a portion of textual information with the corresponding vehicle image.

Although the disclosure discusses the invention with respect to vehicle dealerships and features and/or images associated with advertised vehicles, it is contemplated that neither the exemplary embodiment nor the disclosure is intended to be so limited. Instead, the principles of the disclosure may be directed to receipt of an identifier of an object and an analysis of stored data associated with the identifier including a listing of various features of the object represented by the identifier and, optionally, prioritizing one or more of the features. More specifically, the VTG system described herein may be used for any type of object where automated generation of textual information describing the object is needed. Hence, the VTG system may be used for automatically generating text for any product, especially products for sale or rental such as houses, consumer electronics or the like. Alternatively, the VTG system may be used to automatically generate textual information to best describe a specific individual on a website such as for a dating site.

Data prioritization and feature gathering through the use of a VIN associated with a multimedia presentation has been described in U.S. patent application Ser. No. 15/466,539 entitled "System and Method for Generating and Supplying Viewer Customized Multimedia Presentations," filed Mar. 27, 2017, the entire contents of which are incorporated by reference herein.

II. Terminology

In the following description, certain terminology is used to describe features of the invention. For example, in certain situations, the terms "logic" and "component" are representative of hardware, firmware or software that is configured to perform one or more functions. As hardware, logic (or component) may include circuitry having data processing or storage functionality. Examples of such circuitry may include, but are not limited or restricted to a hardware processor (e.g., microprocessor with one or more processor cores, a digital signal processor, a programmable gate array, a microcontroller, an application specific integrated circuit "ASIC," etc.), a semiconductor memory, or combinatorial elements.

Alternatively, the logic (or component) may be software, such as executable code in the form of an executable application, an Application Programming Interface (API), a subroutine, a function, a procedure, an applet, a servlet, a routine, source code, object code, a shared library/dynamic load library, or one or more instructions. The software may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; semiconductor memory; non-persistent storage such as volatile memory (e.g., any type of random access memory "RAM"); or persistent storage such as non-volatile memory (e.g., read-only memory "ROM," power-backed RAM, flash memory, phase-change memory, etc.), a solid-state drive, hard disk drive, an optical disc drive, or a portable memory device. As firmware, the logic (or component) may be stored in persistent storage.

A "vehicle" is any motorized conveyance that allows a person to travel a greater distance in a shorter period of time than the person could travel alone than allows vehicles used for transportation. One type of vehicle is an automobile that includes a chassis supported by four or more wheels (e.g., a car or a truck). Another type of vehicle is a conveyance without a chassis, such as a motorcycle, an all-terrain vehicle such as a quad, or a scooter for example. Yet another type of vehicle is a boat, wave runner or other water conveyance.

The term "network device" should be construed as electronics with the data processing capability and/or a capability of connecting to any type of network, such as a public network (e.g., Internet), a private network (e.g., a wireless data telecommunication network, a local area network "LAN", etc.), or a combination of networks. Examples of a computing device may include, but are not limited or restricted to, the following: a server, an endpoint device (e.g., a laptop, a smartphone, a tablet, a desktop computer, a netbook, a medical device, or any general-purpose or special-purpose, user-controlled electronic device); a mainframe; a router; or the like.

A "communication" generally refers to information transmitted in one or more electrical signals that collectively represent electrically stored data in a prescribed format. Each communication may be in the form of one or more packets, frames, HTTP-based transmissions, signals transmitted over telephone lines, or any other series of bits having the prescribed format. The term "computerized" generally represents that any corresponding operations are conducted by hardware in combination with software and/or firmware.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

III. General Architecture

Referring now to FIG. 1, an exemplary embodiment of a logical representation of an automated vehicle text generation system 100 is shown. The vehicle text generation (VTG) system 100, in one embodiment, may be stored on a non-transitory computer-readable storage medium of a server device that includes a housing, which is made entirely or partially of a hardened material (e.g., hardened plastic, metal, glass, composite or any combination thereof) that protects the circuitry within the housing, namely one or more processor(s) 106 that are coupled to a communication interface 108 via a first transmission medium. The communication interface 108, under control by a communication interface logic 120, enables communications with external network devices, such as network devices of a set of dealerships and network devices of consumers displaying a website, e.g., the website $132_1$. According to one embodiment of the disclosure, the communication interface 108 may be implemented as a physical interface including one or more ports for wired connectors. Additionally, or in the alternative, the communication interface 108 may be implemented with one or more radio units for supporting wireless communications with other electronic devices. The communication interface logic 120 may perform operations of receiving and transmitting electronic data via the communication interface 108 to enable communications between the VTG system 100 and network devices via a network (e.g., the internet) and/or cloud computing services.

The processor(s) 106 are further coupled to a persistent storage 110 via a second transmission medium. According to one embodiment of the disclosure, the persistent storage 110 may include some or all of the following components: a VIN decoder logic 112, a feature determination logic 114, a feature prioritization logic 116, a server widget logic 111, a VTG logic 118, and the communication interface logic 120. Of course, when implemented as hardware, one or more of these logic units could be implemented separately from each other. In addition, the following data stores may be stored locally as part of the VTG system 100: a build data DS (data store) 122, a VIN patterns DS 124, an unstructured text DS 126, a catalog data DS 128 and a runtime vocabulary scripts DS 130. In some embodiments, one or more of the data stores may be stored remotely and accessible to the VTG system 100. Of course, one or more of the data stores may be implemented together.

Each of the set of dealerships may use the VTG system 100 by integrating logic into for example the dealership websites $132_1$-$132_i$ (e.g., the logic referred to as "a widget," which may be software code). The widget is configured to call the server widget logic 111 when any of the dealership websites $132_1$-$132_i$ is loaded by a consumer. The VTG system 100 enables a consumer, after loading a web page served by, for example, the dealership website $132_1$, to select a specific vehicle located at the dealership and view additional details of the specific vehicle in order to obtain a complete understanding thereof. In particular, in response to receiving user input indicating a selection of a specific vehicle, the widget (not shown) communicates with the server widget logic 111 to obtain information pertaining to the specific vehicle, such as textual information comprehensively describing the vehicle one or more vehicle images of the vehicle. The widget is then able to render a display illustrating an image of the selected vehicle and/or textual information describing the features illustrated in the vehicle image.

More specifically, in response to a request message 105 for, at least, textual information describing a particular vehicle from the widget (e.g., automatically upon activation of the widget when a consumer accesses the dealership website $132_1$ or upon consumer selection of a displayed object associated with a vehicle displayed by the dealership website $132_1$), the server widget logic 111 provides information to the VIN decoder logic 112 included within the request message 105 (e.g., a VIN of the vehicle to be rendered or otherwise selected by the consumer). According to one embodiment, the request message 105 includes the VIN and, optionally, unstructured text, which provides an indication as to one or more features included with the vehicle represented by the VIN.

In one embodiment, the request message 105 may also include (i) a language indicator, which may indicate the language in which text of the website is being displayed to the consumer, and/or (ii) a dealership identifier. Although primarily discussed herein as generating textual information in the English language, the disclosure is not so limited. The VTG logic 118, as discussed below, may utilize the language indicator when generating the textual information to determine the appropriate language.

Based on the VIN, the VIN decoder logic 112 determines vehicle catalog data, which may include at least a make, model, year, and, a specific trim of the vehicle represented by the VIN (collectively referred to as "vehicle catalog data"). In order to decode the VIN, the VIN decoder logic 112 accesses a VIN patterns data store 124 and retrieves the VIN pattern corresponding to the VIN 102. In some embodiments, the VIN pattern may correspond to a methodology for decoding the first 10 characters of the VIN 102.

Additionally, the VIN decoder logic 112 then accesses the build data DS 122, which may be provided by an OEM and include manufacturer's option codes, or "vehicle option codes." In some embodiments, the build data DS 122 may be stored externally from the VTG system 100 and include hundreds or thousands, if not millions, of vehicle option codes. As described above, a "vehicle option code" is a prescribed value that is used by a particular OEM to identify what features are installed on the vehicle identified by the VIN. These features may include standard features that are available for vehicles having a particular vehicle trim (e.g., automatic transmission, 19-inch wheels, cloth interior, etc.) and factory-ordered (non-standard) features that may constitute upgrades (e.g., leather interior, heated seats, lumbar support seating, 21-inch wheels, etc.). The features determined by accessing the build data are collectively referred to as "manufacturer's options."

In some situations, build data corresponding to a particular VIN is not present within the build data DS 122, e.g., an OEM may not have provided the option codes corresponding to the vehicle represented by the particular VIN, or is otherwise not available. In such situations, the VIN decoder logic 112 may access the unstructured text data store 126 to retrieve any unstructured text stored therein that corresponds to the VIN 102. In some instances, the OEM may not provide structured build data but instead may provide data describing or listing features in various formats (referred to as "unstructured"). The VIN decoder logic 112 retrieves the corresponding unstructured text for use by the feature prioritization logic 116 and the VTG logic 118, discussed below. The term "selected manufacturer's options" as used herein may also include data retrieved from the unstructured text data store 126.

Figure 2:
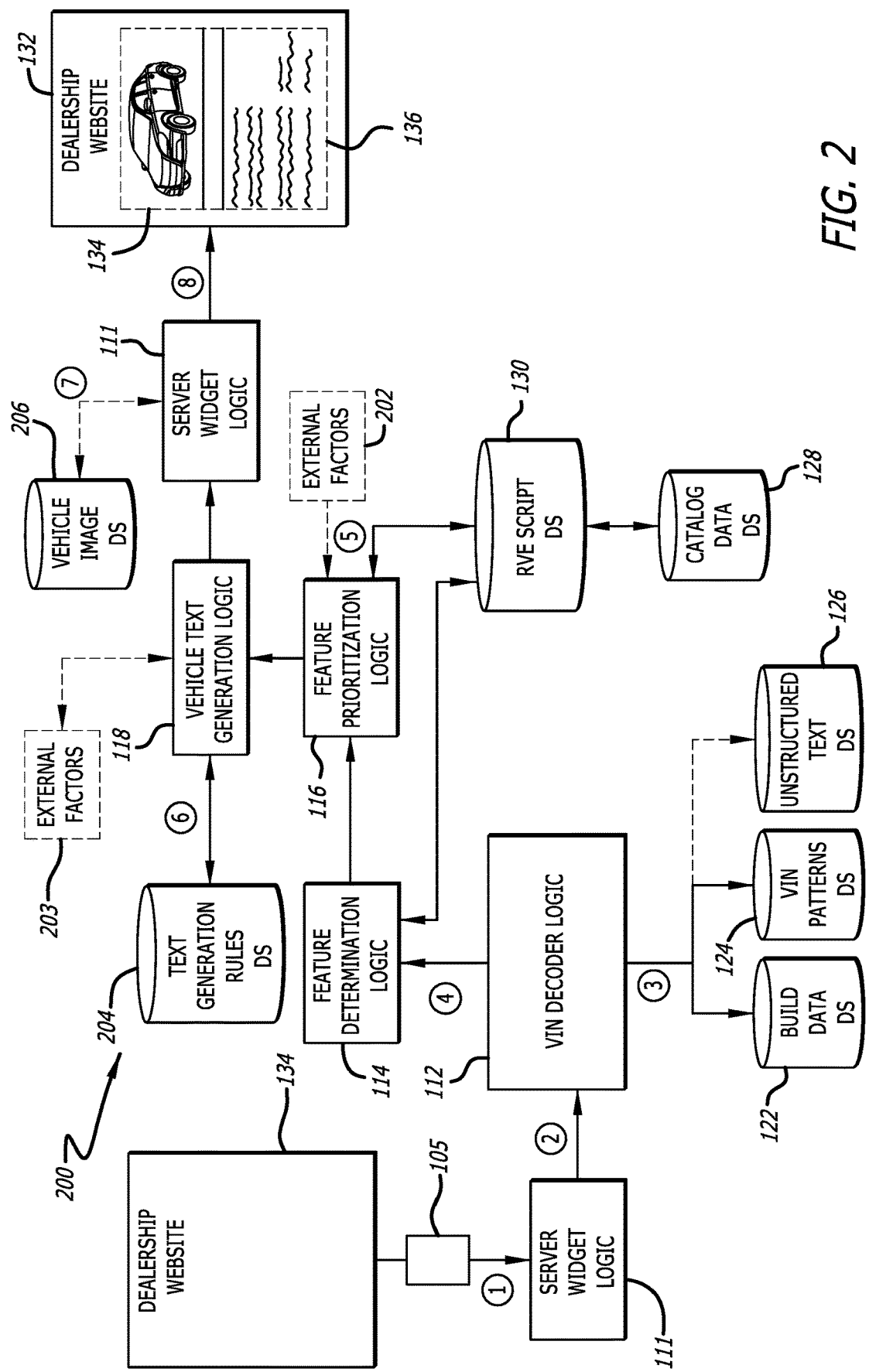
FIG. 2 is a block diagram illustrating a general flow of operations performed by the automated vehicle text generation system of FIG. 1.

Upon determining the selected manufacturer's options, feature determination logic 114 of the VIN decoder logic 112 accesses "catalog data" to determine any additional features associated with the vehicle represented with the VIN that are supplemental to the manufacturer's options. In some embodiments, the content of the catalog data may be normalized into industry-standard IC codes ("industry comparison" codes), wherein each feature may correspond to an IC code. The feature determination logic 114 maps the IC codes to the VIN 102. In some embodiments, as illustrated in FIGS. 1-2, the feature determination logic 114 may be integrated into the VIN decoder logic 112. However, in other embodiments, the feature determination logic 114 and the VIN decoder logic 112 may be separate components.

Given that the generated textual information is to be provided to a consumer, selection and prioritization of features to highlight in the textual information may prove critical in maintaining the interest of the consumer, as well as providing a comprehensive description of a particular vehicle. Therefore, the feature prioritization logic 116 is deployed by the VTG system 100 to perform one or more prioritization schemes that group and/or sort the features associated with the particular vehicle identified by the VIN included in the request message 105. More specifically, the feature prioritization logic 116 may perform at least a first prioritization operation on the feature content, namely prioritizing features within groupings (referred to as "sections") and subgroupings (referred to as "subsections"), as described herein.

Accompanying each of the subsections and/or features is metadata that identifies a priority value (ranking) to different subsections and features. The priority values represent what subsections and/or features are "notable" for each particular vehicle, namely what features or grouping of features is more important in a vehicle purchasing decision than others based on marketing data, surveys and other third-party analytics. Whether a feature is considered "notable" may depend, at least in part, on the vehicle type (e.g., car, truck, SUV, van, commercial) associated with the VIN provided from the widget and/or external factors. Examples of external factors may include, but are not limited or restricted to (i) information extracted from an online profile of the consumer, and (ii) information extracted from the request message, including address information that may identify a geographic region of the consumer, or the like.

Herein, the feature prioritization logic 116 assigns a priority value (ranking) to each section for the vehicle based at least on vehicle type, where certain sections for one type of vehicle may be more "notable" than sections associated with another type of vehicle. For instance, where the VIN identifies the vehicle being displayed is of a "truck" vehicle class, the feature prioritization logic 116 may organize different priority values to the sections than the priority values assigned to identical sections within a "van" vehicle class (i.e., the "powertrain and mechanical" section may have a higher priority value than the "comfort" section). Additionally, each subsection priority value and feature priority value may be assigned a default priority value to capture what features are notable for each particular vehicle (i.e., what features tend to be most important in a vehicle purchasing decision), and these default priority values may be altered by external factors as described below.

The feature prioritization logic 116 additionally accesses a runtime vocabulary (RV) scripts data store 130 that stores text such as descriptors or labels corresponding to each vehicle option code and/or IC code referenced above. The feature prioritization logic 116 provides to the VTG logic 118, for each feature: (1) a ranking; and (2) text characterizing the feature. For example, the VIN decoder logic 112 may determine the vehicle represented by the VIN 102 includes an IC code, e.g., "FAB01", and the feature prioritization logic 116 accesses the RVE script data store 130 to determine that the IC code corresponds to leather seats. The text "leather seats," as an example, is then provided to the VTG logic 118 for use in the automatic generation of the textual information describing the vehicle represented by the VIN 102.

Following the retrieval of (1) the ranking for each feature and (2) text characterizing each feature for all features of the vehicle represented by the VIN 102, the VTG logic 118 performs operations that include at least (i) determining a use case applicable to the VIN 102 based on the decoding of the VIN 102 and the presence, or lack thereof, of corresponding build data, (ii) retrieving the applicable rule set, and (iii) automatically generating textual information describing the vehicle represented by the VIN 102 according to the features determined to be included in the vehicle represented by the VIN 102. More specifically with respect to the automatic generation of the textual information, the VTG logic 118 constructs sentences comprising the textual information by appending portions of text dictated by the applicable rule set and text characterizing one or more features as provided to the VTG logic 118 by the feature prioritization logic 116 along with the appropriate punctuation.

In detail, the VTG logic 118 analyzes the vehicle catalog data and the presence (or lack thereof) of build data corresponding to the vehicle represented by the VIN 102 to determine an applicable "use case," wherein the use case indicates the applicable rule set to be used in generating the textual information. In some embodiments, the VTG logic 118 determines which the following use cases apply, although others have been contemplated: (1) build data is present and the specific trim is known; (2) build data is not present and the specific trim of the vehicle represented by VIN 102 is known; (3) build data is not present and the specific trim of the vehicle represented by VIN 102 is not known; and (4) build data is present but the specific trim of the vehicle represented by VIN 102 is known.

With respect to the first use case, when build data is present and the specific trim is known, the applicable rule set establishes the procedure for constructing a plurality of sentences to describe the vehicle represented by the VIN 102 to include the text characterizing a predetermined number of features based on their prioritization. For instance, the applicable rule set may indicate a particular sentence structure for which text characterizing a feature is appended or prepended to "connecting text" (e.g., text required to form a full and complete sentence, which in some embodiments may be predetermined and set forth in the applicable rule set) along with the proper punctuation. The applicable rule set may indicate inclusion of features including, but not limited to, tires (when the vehicle is new), year, make, model, engine, manufacturer, trim details (including any indication of collaborations with third-parties or other limited editions, e.g., Ford Explorer Eddie Bauer edition), engine and transmission descriptions, special option packages (e.g., blind spot assist packages, navigation packages, enhanced audio packages, etc.), exterior and/or interior color(s), pricing information, etc. Additionally, the applicable rule set may establish a procedure for listing particular features based on each's ranking and assigned subsection, such that features of a particular subsection may be listed together within a complete sentence. One illustrative example may include: "Comfort features include: climate control, sunroof, heated seats and auto dimming rear view mirror."

With respect to the second use case, build data is not present but the specific trim of the vehicle represented by VIN 102 is known, the applicable rule set establishes the procedure for constructing a plurality of sentences to describe the vehicle represented by the VIN 102 in a similar manner as discussed above with respect to the first use case. However, when build data is not accessible to the VTG system 100 for the vehicle represented by the VIN 102, textual information generated according to the second use case is likely to include less information than textual information generated according to the first use case (unless unstructured text for the vehicle represented by the VIN 102 includes all information typically provided by the build data). For instance, textual information generated according to the applicable rule set for the second use case may include, but is not limited or restricted to, tires (when the vehicle is new), year, make, model, engine, manufacturer, trim details (including any indication of collaborations with third-parties or other limited editions). However, the textual information generated according to the applicable rule set for the second use case may lack a description of engine and transmission descriptions, special option packages (e.g., blind spot assist packages, navigation packages, enhanced audio packages, etc.), exterior and/or interior color(s), pricing information, etc. Further, when unstructured text is accessible corresponding to the VIN 102, the VTG logic 118 may include listings of various features according to each feature's ranking and assigned subsection, as referenced with respect to the first use case.

With respect to the third use case, build data is not present and the specific trim of the vehicle represented by VIN 102 is not known (e.g., several trim options available but information identifying corresponding to the VIN 102 is inaccessible), the applicable rule set establishes the procedure for constructing a plurality of sentences to describe the vehicle represented by the VIN 102 in a similar manner as discussed above with respect to the second use case. However, the textual information generated in accordance with the applicable rule set for the third use case may only include a description of features that are common across all trim options.

With respect to the fourth use case, build data is present but the specific trim of the vehicle represented by VIN 102 is not known (e.g., several trim options available but information identifying corresponding to the VIN 102 is inaccessible), the applicable rule set establishes the procedure for constructing a plurality of sentences to describe the vehicle represented by the VIN 102 in a similar manner as discussed above with respect to the first use case. However, the textual information generated in accordance with the applicable rule set for the fourth use case does not include a description of features associated with specific trim styles.

The server widget logic 111 may then provide data 131 including at least the textual information to the widget, which in turn may cause the rendering of, for example, the text display portion $136_1$ of the dealership website $132_1$. As will be discussed below, the server widget logic 111 may also perform options resulting in retrieval of one or more vehicle images and inclusion of the vehicle images (or links to the vehicle images) for rendering of the vehicle display portion $134_1$ within the data 131.

Referring to FIG. 2, a block diagram illustrating a general flow of operations 200 performed by the vehicle text generation system 100 of FIG. 1 is shown. As discussed above in FIG. 1, the VTG system 100 includes the VIN decoder logic 112 that decodes a VIN and determines standard equipment included in the vehicle represented by the VIN; the build data DS 122 that stores vehicle option codes associated with the millions of VINs; the feature determination logic 114 that determines additional features of a vehicle represented by a VIN (e.g., features in addition to the manufacturer's options); the catalog data DS 126, which stores additional features other than the manufacturer's options; the RVE script data store 130 that stores scripts and/or rule sets that dictate the generation of textual information describing a vehicle; the feature prioritization logic 116 that determines priority of features included in the vehicle represented by the VIN; the VTG logic 118 that automatically generates textual information that describes the vehicle represented by the VIN and the server widget logic 111 that controls the organization of the textual information and/or vehicle images for return of the textual information and/or vehicle images to the widget (not shown) initiating a request.

The flow of operations 200 begins when there is an attempt to load the dealership website $132_1$, for example with a web browser, and a widget on a dealership website is executed, causing a request message 105 to be transmitted to the server widget logic 111 (operation 1). In some embodiments, the widget of the dealership website $132_1$ may be logic integrated with the website code, wherein the widget may be software code that, upon execution, communicates with the server widget logic 111, which may occur when the dealership website 132₁ is loading in a web browser. As discussed above, the request message 105 includes a VIN 102 and optionally unstructured text 104. In particular, the VIN 102 pertains to a specific vehicle on a lot of a specific dealership. As an illustrative example, the vehicle having a VIN of "1HHCM82637JAxxxxxx" (e.g., VIN 102) may be located on a lot of a first dealership and available for purchase (e.g., sale or lease) by a consumer. A consumer may attempt to retrieve information about the vehicle having VIN 102 from the dealership website 132₁ (i.e., leading to operation 1).

Thereafter, the server widget logic 111 provides at least the VIN 102 to the VIN decoder logic 112 (operation 2). The VIN decoder logic 112 performs operations to decode the VIN 102 including accessing one or more VIN patterns and "build data" to determine vehicle option codes associated with the VIN 102 (operation 3). The operations performed by the VIN decoder logic 112 result in a determination of vehicle catalog data, which may include at least a make, model, year and, optionally, a specific trim of the vehicle represented by the VIN 102. The vehicle catalog data may be determined according to a VIN pattern corresponding to the VIN 102 and retrieved from the VIN patterns data store 124. Subsequently, the VIN decoder logic 112 accesses the build data and maps the VIN 102 to known vehicle option codes to determine selected manufacturer's options included in the vehicle represented by the VIN 102. Thus, the operations performed by the VIN decoder logic 112 results in a determination of (i) catalog vehicle data, and (ii) selected manufacturer's options included in the vehicle represented by the VIN 102. Specifically, the catalog vehicle data includes the following information of the vehicle represented by the VIN 102: year, make, model and trim. Additionally, the selected manufacturer's options may be in the form of manufacturer option codes (e.g., a coding system indicating selected manufacturer's options often specific to a particular manufacturer). Upon determining (i) catalog vehicle data, and (ii) selected manufacturer's options included in the vehicle represented by the VIN 102, the VIN decoder logic 112 provides this data to the feature determination logic 114.

According to one embodiment of the disclosure, the general flow of operations performed by the VTG system 100 continues with a determination, by the feature determination logic 114, of a normalized list of features based on at least the selected manufacturer's options for the vehicle represented by the VIN 102 (operation 4). In some embodiments, the normalized list of features is determined according to the following procedure: (1) the feature determination logic 114 provides the selected manufacturer's options included in the vehicle represented by the VIN 102 in the form of option codes to a RVE script stored in the RVE script DS 130; (2) the RVE script queries the catalog data DS 128 and performs a mapping of the option codes to IC codes, wherein the mapping indicates a feature that is genericized across all vehicle manufacturers (e.g., thus "normalizing" the feature); (3) the RVE script then provides a list of normalized features (and optional textual information corresponding to each normalized feature) to the feature determination logic 114. The IC codes represent a mapping of manufacturers' option codes to a genericized coding system enabling the VTG system 100 to normalize each manufacturer option codes. As used herein below with respect to FIG. 2, the term "features" refers to the vehicle catalog data and the selected manufacturer's option included in the vehicle represented by the VIN 102. As further shown in FIG. 2, following the determination of the normalized list of features corresponding to the vehicle represented by the VIN 102, the feature prioritization logic 116 performs one or more prioritization schemes that group and/or sort the features associated with the particular vehicle identified by the VIN (operation 5). More specifically, the feature prioritization logic 116 may prioritize features within the sections and subsections, discussed above. Accompanying each of the subsections and/or features as part of the retrieved stored information is metadata that identifies a priority value (ranking) assigned to that subsection and/or each feature. The priority values represent what subsection(s) and/or feature (s) are "notable" for each particular vehicle, namely what features or grouping of features are the more important in a vehicle purchasing decision. Whether a feature is considered to be a "notable" feature may depend, at least in part, on the vehicle type and/or external factors. The overall priority value associated with a feature may depend, at least in part, on (i) the vehicle type (e.g., car, truck, sport utility vehicle "SUV", van, commercial) determined from the VIN 102, (ii) the priority value assigned to the subsection associated with the feature, and/or (iii) any external factors 202 (e.g., consumer profile, geography, etc.) learned from meta-information included as part of a request message 105.

As referenced above, the feature prioritization logic 116 accesses the RVE script data store 128 and provides to the VTG logic 118, for each feature, (1) the ranking for each feature and (2) text characterizing the feature. The VTG logic 118 then analyzes the vehicle catalog data and the presence (or lack thereof) of build data corresponding to the vehicle represented by the VIN 102 to determine an applicable use case in order to determine an applicable rule set used in generating textual information describing the vehicle represented by the VIN 102. As discussed above, the VTG logic 118 may determine whether one of the following use cases applies: (1) build data is present; (2) build data is not present and the specific trim of the vehicle represented by VIN 102 is known; (3) build data is not present and the specific trim of the vehicle represented by VIN 102 is not known; and (4) build data is present but the specific trim of the vehicle represented by VIN 102 is known.

For each use case, the applicable rule set is retrieved, for example from the text generation rules DS 204 (operation 6). The VTG logic 118 then constructs a plurality of sentences, which when assembled together in a paragraph, describe the vehicle represented by the VIN 102. In some embodiments, the VG logic 118 may also utilize external factors 203 in constructing the plurality of sentences. As discussed above, the execution of the applicable rule set causes the VTG logic 118 to perform operations including appending or prepending text characterizing a particular feature to "connecting text along with the proper punctuation. The prioritization of one or more features may be accounted for during execution of the applicable rule set. The textual information generated according to each rule set is likely to vary depending on the information accessible to the VTG system 100 in, at least, the VIN pattern DS 124, the build data 122, the unstructured text DS 126, the catalog data DS 128 and the RVE script DS 130.

After the generation of the textual information describing the vehicle represented by the VIN 102, the server widget logic 111 may perform optional operations that include querying a vehicle image data store 206 for images corresponding to assigned image classes of features associated with the VIN 102 (operation 7). Thereafter, the server widget logic 111 may perform a correlation operation to identify features and vehicle images corresponding to the same image class. More specifically, operating with the feature prioritization logic 116, the server widget logic 111 may correlate textual information corresponding to a particular feature and a vehicle image assigned to the same image class as that feature, and return to the widget a URL associated with the textual information and the vehicle image. The predetermined number of vehicle images provided to the widget and the corresponding textual information may be based, at least in part, on the display size supported by the widget.

For instance, a first vehicle image may be assigned to "class 10" and a first plurality of features associated with vehicle$_{VIB=1HHCM8}$ . . . may be assigned to "class 10" as well. The server widget logic 111 generates an image-to-feature association based on the feature prioritization provided by the feature prioritization logic 116, where a subset of the first plurality of features are associated with the first vehicle image in the event that the display sizing available for displaying the feature content with the vehicle image $202_1$ cannot accommodate feature content for all of the plurality of features. The image-to-feature association may also include an indication to a portion of the textual information that describes a feature shown in the first vehicle image. As a result, when a dealership website is rendered for a consumer, the dealership website may include (i) the first vehicle image, and (ii) at least the portion of the textual information describing a feature shown in the first vehicle image.

The server widget logic 111 may then provide at least the textual information to the widget, which in turn causes the rendering of the text display portion $136_1$ of the dealership website $132_1$ (operation 8). In addition, in embodiments in which the server widget logic 111 queried the vehicle image data store 206 for images corresponding to assigned image classes of features associated with the VIN and generated an image-to-feature association, the image-to-feature association may also be provided to the widget. The widget may then cause rendering of the image display portion $134_1$ of the website $132_1$.

Finally, upon receiving the image-feature association from the server widget logic 111, the widget controls the display of the textual information and one or more vehicles images with the prioritized features as provided from the server widget logic 111, which may result in the rendering of the image display portion $134_1$ and the vehicle text display portion $136_1$.

By providing the consumer with specific textual information that accurately and comprehensively describes the vehicle having the VIN 102 of, for example, "1HHCM82637JAxxxxx," the consumer benefits by gaining a complete understanding of the vehicle and all of its specific and, possibly, distinctive features. Additionally, the dealership benefits when the consumer has a complete understanding of the all specific and, possibly, distinctive features of a vehicle, as the consumer may be more likely to purchase that vehicle as opposed to a similar vehicle that does not have its specific features listed on a web site (or other physical medium).

Figure 3:
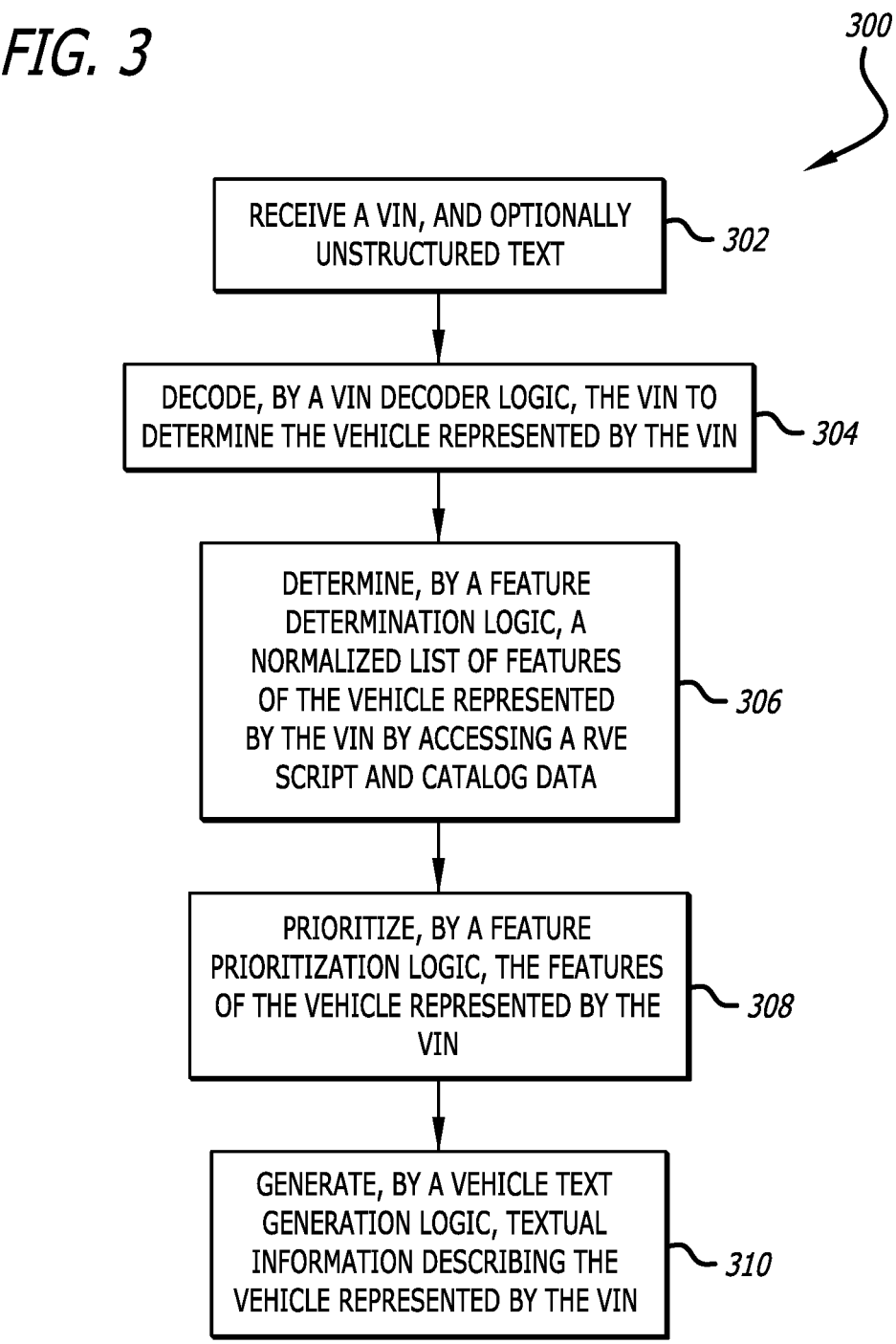
FIG. 3 is a flowchart illustrating the utilization of a received vehicle identification number (VIN) by the automated vehicle text generation system of FIG. 1 to generate textual information describing the vehicle represented by the VIN.

Referring to FIG. 3, a flowchart illustrating the utilization of a received vehicle identification number (VIN) by the automated vehicle text generation system of FIG. 1 to generate textual information describing the vehicle represented by the VIN is shown according to some embodiments. Each block illustrated in FIG. 3 represents an operation performed in the method 300 of generating textual information based on received user input. In one embodiment, it is assumed that prior to the beginning of the method 300, a dealership website has been loaded via an internet browser, with the server widget logic 111 of FIG. 1 causing the rendering of a display on at least a portion of dealership's website. Thus, the method 300 commences when a VIN is received by the automated vehicle text generation system representing a particular vehicle, (block 302). Further, as illustrated by FIG. 3, unstructured text may also be received by the automated vehicle text generation system. In response to receiving the VIN, a VIN decoder logic of the vehicle text generation system decodes the VIN to determine the vehicle represented by the VIN (block 304). In some embodiments as discussed above, the VIN decoder logic may determine (i) catalog vehicle data (year, make, model and trim of the vehicle), and (ii) selected manufacturer's options included in the vehicle represented by the VIN.

Based at least on the vehicle catalog data and the selected manufacturer's options, a feature determination logic determines a normalized list of features of the vehicle represented by the VIN by accessing a RVE script from the RVE script DS 130 and, indirectly, the catalog data (block 306). Accessing RVE script may include providing the RVE script with the option codes determined by the VIN decoder logic such that the RVE script performs a mapping of the option codes to IC codes. The mapping tables and listing of IC codes may be stored in the catalog data. As used herein below with respect to FIG. 3, the term "features" refers to the combination of the vehicle catalog data and the selected manufacturer's options.

Subsequent to the determination of the features, a feature prioritization logic of the automated vehicle text generation system prioritizes the features of the vehicles represented by the VIN (block 308). As discussed above, the feature prioritization logic performs operations corresponding to one or more prioritization schemes, including the grouping and/or sorting features associated with the vehicle represented by the received VIN.

Following the prioritization of the features, a VTG logic of the automated vehicle text generation system automatically generates textual information describing the vehicle represented by the VIN (block 310). The automated textual information generation process includes (i) determining a use case applicable to the received VIN based on the decoding of the received VIN and the presence, or lack thereof, of corresponding build data, (ii) accessing of the applicable rule set, and (iii) automatically constructing sentences according to an applicable rule set corresponding to the determined use case through the appending and prepending of text characterizing the features determined to be included in the vehicle represented by the received VIN to connecting text and punctuation.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A system for automatically generating textual information describing a vehicle being advertised for purchase, the system comprising:
   a processor; and
   a memory communicatively coupled to the processor, the memory includes:
      vehicle identification number (VIN) decoder logic configured, when executed by the processor, to automatically decode a VIN provided in a request message to determine the vehicle represented by the VIN;

feature determination logic configured, when executed by the processor, to (i) retrieve vehicle option codes being prescribed values each used by a manufacturer of the vehicle to indicate equipment installed on the vehicle identified by the VIN and (ii) determine a list of features associated with the vehicle based, at least in part, on (a) conducting a mapping between the retrieved vehicle option codes and standardized codes and (b) conducting a translation of the standardized codes into the list of features;

feature prioritization logic communicatively coupled to the feature determination logic, the feature prioritization logic, when executed by the processor, is configured to determine and assign a priority value to at least each feature of the list of features associated with the vehicle based on (i) a vehicle type determined from the VIN provided in the request message and (ii) information associated with a consumer interested in the vehicle included as part of meta-information associated with the request message; and vehicle text generation logic configured, when executed by the processor, to automatically generate textual information describing the vehicle by constructing sentences from text characterizing a predetermined number of features from the list of features based on priority values of the predetermined number of features.

2. The system of claim 1, wherein the VIN decoder logic to decode the VIN by at least (i) determining attributes of the vehicle including at least a make, a model and a year, and (ii) retrieving the vehicle option codes from a first data store, wherein the vehicle option codes are associated with the VIN.

3. The system of claim 2, wherein the conducting of the translation of the standardized codes to determine the list of features includes (i) accessing a script from a second data store, wherein execution of the script causing querying of a third data store to retrieve mapping information of the retrieved vehicle option codes to the standardized codes, (ii) determining a set of standardized codes that correspond to the vehicle option codes based on the mapping information, and (iii) compiling text corresponding to each of the standardized codes into the list of features.

4. The system of claim 1, wherein the vehicle text generation logic to generate the textual information describing the vehicle by at least (i) constructing the sentences according to a rule set selected based on an analysis of the predetermined number of features and whether catalog data corresponding to the VIN is accessible, and (ii) assembling the sentences into one or more paragraphs describing the vehicle.

5. The system of claim 1, wherein the vehicle text generation logic is configured to be in communication with a widget integrated into website code, and wherein the vehicle text generation logic transmits instructions to the widget that, upon execution, cause rendering of the textual information describing the vehicle.

6. A computerized method, the method comprising:

receiving, from server widget logic over a network responsive to a request message from a consumer, data including a vehicle identification number (VIN) associated with a vehicle;

decoding the VIN to retrieve vehicle option codes from data provided by a manufacturer of the vehicle, each of the retrieved vehicle option codes being a prescribed value that indicates equipment installed on the vehicle identified through the VIN;

determining a plurality of features associated with the vehicle based, at least in part, on a translation of the retrieved vehicle option codes into standardized codes and a translation of the standardized codes into the plurality of features;

determining and assigning a priority value to at least each feature of the plurality of features associated with the vehicle based on (i) a vehicle type determined from the VIN provided in the request message and (ii) information associated with the consumer included as part of meta-information associated with the request message; and generating textual information describing the vehicle by constructing sentences from text characterizing a predetermined number of features from the plurality of features based on priority values of the predetermined number of features.

7. The computerized method of claim 6, wherein the server widget logic is executed in association with loading of a website, and wherein execution of the server widget logic results in transmission of the data over the network.

8. The computerized method of claim 6, wherein decoding the VIN is performed by a VIN decoder logic and includes operations of:

determining attributes of the vehicle including at least a make, a model and a year, and retrieving the vehicle option codes from a first data store, wherein the vehicle option codes are associated with the VIN, wherein each vehicle option code is a prescribed value that is used by a manufacturer of the vehicle to identify an option installed on the vehicle.

9. The computerized method of claim 8, wherein determining the plurality of features is performed by a feature determination logic and includes operations of:

accessing a script from a second data store, wherein execution of the script causing querying of a third data store to retrieve mapping information from vehicle option codes to standardized codes, determining the standardized codes that correspond to the vehicle option codes based on the mapping information, and compiling text corresponding to each of the standardized codes into the plurality of features.

10. The computerized method of claim 9, wherein prioritizing the features of the plurality of features is performed by a feature prioritization logic and includes performance of at least:

performing one or more prioritization schemes including identifying of a priority value for one or more of the features included in the plurality of features.

11. The computerized method of claim 6, wherein generating the textual information describing the vehicle is performed by a vehicle text generation logic and includes operations of:

constructing the sentences according to a rule set based on the text characterizing the plurality of features in accordance with priority values assigned to the plurality of features; and assembling the sentences into one or more paragraphs describing the vehicle.

12. The computerized method of claim 6, further comprising:

retrieving one or more vehicle images from a vehicle image data store;

correlating textual information corresponding to a particular feature with a first vehicle image illustrating the particular feature; and providing instructions, that when executed, cause the rendering of the textual information and the first vehicle image on a display screen.

13. A non-transitory, storage medium having instructions stored thereon that, in response to execution by a processing device, cause performance of operations comprising:

receiving, from server widget logic over a network responsive to a request message from a consumer, data including a vehicle identification number (VIN) associated with a vehicle;

decoding the VIN to retrieve vehicle option codes from data provided by a manufacturer of the vehicle, each of the retrieved vehicle option codes being a prescribed value that indicates equipment installed on the vehicle identified through the VIN;

determining a plurality of features associated with the vehicle based, at least in part, on a translation of the retrieved vehicle option codes into standardized codes and a translation of the standardized codes into the plurality of features;

determining and assigning a priority value to at least each feature of the plurality of features associated with the vehicle based on (i) a vehicle type determined from the VIN provided in the request message and (ii) information associated with the consumer included as part of meta-information associated with the request message; and generating textual information describing the vehicle by constructing sentences from text characterizing a predetermined number of features from the plurality of features based on priority values of the predetermined number of features.

14. The non-transitory storage medium of claim 13, wherein the server widget logic is executed in association with loading of a website, and wherein execution of the server widget logic results in transmission of the data over the network.

15. The non-transitory storage medium of claim 13, wherein decoding the VIN to determine the vehicle represented by the VIN includes: (i) determining attributes of the vehicle including at least a make, a model and a year, and (ii) retrieving the vehicle option codes from a first data store, wherein the vehicle option codes are associated with the VIN.

16. The non-transitory storage medium of claim 15, wherein the instructions, in response to execution by the processing device, cause performance of further operations including:

accessing a script from a second data store, wherein execution of the script causing querying of a third data store to retrieve mapping information from vehicle option codes to standardized codes, determining the standardized codes that correspond to the vehicle option codes based on the mapping information, and compiling text corresponding to each of the standardized codes into the plurality of features.

17. The non-transitory storage medium of claim 16, wherein the instructions, in response to execution by the processing device, cause performance of further operations including:

performing one or more prioritization schemes including identifying of a priority value for one or more of the features included in the normalized list of features.

18. The non-transitory storage medium of claim 13, wherein the instructions, in response to execution by the processing device, cause performance of further operations including:

constructing the sentences according to a rule set based on the text characterizing the plurality of features in accordance with priority values assigned to the plurality of features; and assembling the sentences into one or more paragraphs describing the vehicle.

19. The non-transitory storage medium of claim 13, wherein the instructions, in response to execution by the processing device, cause performance of further operations including:

retrieving one or more vehicle images from a vehicle image data store;

correlating textual information corresponding to a particular feature with a first vehicle image illustrating the particular feature; and providing instructions, that when executed, cause the rendering of the textual information and the first vehicle image on a display screen.

* * * * *